United States Patent [19]

Hillier et al.

[11] Patent Number: 4,464,081

[45] Date of Patent: Aug. 7, 1984

[54] PROCESS AND STRUCTURE FOR STORING AND ISOLATING HAZARDOUS WASTE

[75] Inventors: Edward Hillier, Baytown; Larry Graybill, Houston; Richard Winders, La Porte; Dan Bridge, Friendswood; Joe Dauchy, Bellaire, all of Tex.

[73] Assignee: Rollins Environmental Services, Inc., Wilmington, Del.

[21] Appl. No.: 509,137

[22] Filed: Jun. 29, 1983

[51] Int. Cl.³ .............................................. B65G 5/00
[52] U.S. Cl. ................................... 405/128; 405/53; 405/54
[58] Field of Search ............................ 405/52–59, 405/128, 129; 166/305 D

[56] References Cited

U.S. PATENT DOCUMENTS

| | | | |
|---|---|---|---|
| 3,136,135 | 6/1964 | Rigby et al. | 405/53 X |
| 3,505,820 | 4/1970 | Draper et al. | 405/53 |
| 3,701,262 | 10/1972 | Connell et al. | 405/53 |
| 4,335,978 | 6/1982 | Mutch | 405/129 |
| 4,352,601 | 10/1982 | Valiga et al. | 405/54 X |
| 4,362,434 | 12/1982 | Valiga et al. | 405/53 X |
| 4,425,743 | 1/1984 | Bartur | 405/53 X |
| 4,430,021 | 2/1984 | Wagner et al. | 405/129 |

*Primary Examiner*—Dennis L. Taylor
*Attorney, Agent, or Firm*—Finnegan, Henderson, Farabow, Garrett & Dunner

[57] ABSTRACT

A hazardous waste system for safely containing hazardous waste and monitoring any water or leachates that might exist in the system. The system includes several protective layers for surrounding the hazardous waste, a perimeter wall to minimize any horizontal slippage of the hazardous waste, a cap to protect the hazardous waste from the surface environment, and a support base including an impervious top surface above the ground for providing a barrier between the ground and the hazardous waste.

26 Claims, 6 Drawing Figures

PROCESS AND STRUCTURE FOR STORING AND ISOLATING HAZARDOUS WASTE

BACKGROUND OF THE INVENTION

1. Field of the Invention

The present invention relates generally to a process and structure for disposing of or storing hazardous waste materials above ground and isolating the hazardous waste material from the environment, specifically including surface and ground water.

2. Description of the Prior Art

There are literally millions of tons of hazardous waste materials that have been generated through numerous governmental, industrial, and private operations. Much of that generated waste is now held in open storage pits or containers. Today, tremendous quantities of hazardous wastes are continuously being generated. These hazardous waste contain various contaminants, and unless the wastes are properly isolated or disposed of, the contaminants in the waste can leach into the surrounding environment, earth and ground water and thereby damage the environment and pose significant risks to human life.

Hazardous wastes often include significant quantities of commercially desirable and expensive materials, such as mercury, zinc, chromium, magnesium and copper, to name a few. Although it is now often difficult or impossible to economically recover such materials from wastes, future advancements in technology and the probable rising costs for those materials might make their recovery an economic reality in the future. Under presently available hazardous waste disposal techniques, these materials are either incinerated and lost forever, or are buried in such a manner that it is either impossible or extremely difficult and costly to gain later access to the waste and materials.

Because of the detrimental nature of hazardous waste, a generator of the waste must dispose of or properly isolate the waste in some manner. If a waste-generator fails to take appropriate action, it will subject itself to a high risk of fines and potential lawsuits. Perhaps more importantly when the inevitable leaching of contaminants in unisolated hazardous waste occurs, the generator will then have to take direct remedial action. This remedial action in almost all cases will be more expensive than the cost of initially isolating or disposing of the waste. Furthermore, a generator failing to properly dispose of hazardous waste may be liable for the resultant damages to property and persons.

Despite the relative importance of waste disposal to industry and the community, the presently available options to dispose of hazardous waste are limited. Today, hazardous waste must be disposed of in compliance with existing governmental statutes and regulations. For the millions of tons of hazardous wastes that already exist, the available options are severly limited. Under current EPA regulations, existing hazardous waste can be disposed of only through land treatment, such as deep wells and landfills, or technical treatment, such as incineration, chemical treatment, or biological treatment.

Today hazardous waste materials are usually either disposed of through an incineration process or contained or isolated in a government-permitted ground cavity. The disposal of hazardous waste through incineration is an expensive process. The hazardous waste first must be processed and transported to an incinerator. The cost of transporting tons of waste by special containers or vehicles can be expensive. Moreover, the transportation of hazardous waste from the generator's premises to an incinerator may increase the risk of contamination since contamination can occur during the initial processing and subsequent transportation of the waste. Even when the waste reaches the incineration site, the cost of actual disposal is expensive because the incineration process itself has large capital, energy and process material costs.

Because of the high costs of technical treatment of wastes, land treatment is often the method chosen to dispose of hazardous wastes. By regulation, hazardous wastes can only be land treated at government-permitted treatment sites. Most approved land treatment sites are underground landfills, and these sites are limited both in number and in geographic location. Therefore, most existing hazardous waste must be transported to approved waste sites. Again, the cost of transporting wastes to approved landfills can be expensive.

Below ground land disposal, if improperly performed, may be unreliable, and if failure occurs, the resultant contamination may be difficult to control. Below ground disposal systems, whether they be land farms, landfills, or deep wells, are located in the sometimes unpredictable medium of earth and ground water. If surface water reaches the hazardous waste, leachate over time may seep into and contaminate the surrounding earth and ground water. Once contamination of the surrounding earth occurs, the contamination may be difficult to control. If ground water is contaminated, expensive remedial procedures will be required to control or isolate the contamination itself.

It is necessary to accurately monitor any leakage of water to or from hazardous waste materials held in below ground containments, and monitoring systems to accomplish this are complex, expensive and not always reliable. Therefore, existing monitoring systems for below ground landfills often can only sense when contamination actually occurs. They seldom warn of a potential problem which can be corrected before actual contamination takes place.

As it is evident from the foregoing discussion, conventional land disposal methods for processing hazardous wastes can pose hazards to the environment or public health and may require significant monitoring, corrective and remedial actions.

SUMMARY OF THE INVENTION

The object of the present invention is to provide an improved, safe and economic process and structure for disposing of and isolating a wide variety of hazardous waste materials from the surrounding environment. An additional object is to provide a process and structure for storing hazardous waste which includes a monitoring system for checking the integrity of the waste disposal system and for providing warning information which can be acted upon before contamination occurs. Yet a further object is to provide a process and structure which is resistant to weather conditions, such as rain, snow, wind, tornados, hurricanes, temperature, and earthquakes. Another object is to provide a structure which can be made from readily available materials and which operates primarily on gravity flow principles, rather than mechanical pumping. Still another object is to provide a load-bearing waste disposal vault which can serve as a base for a wide variety of structures.

Additional objects and advantages of the invention will be set forth in part in the description which follows, and in part will be obvious from the description, or may be learned by practice of the invention. The objects and advantages may be realized and attained by means of the processes, elements and combinations particularly pointed out in the appended claims.

To achieve the objects and in accordance with the purpose of the invention, as embodied and broadly described herein, the structure of this invention comprises a hazardous waste system for safely containing hazardous waste substances comprising a first protective layer for surrounding the hazardous waste, a liner around the protective layer, the liner being relatively impervious to water and to leachates that the hazardous waste might produce, a pervious second protective layer around said liner, the second protective layer providing a pervious infiltration layer formed around the sides and top of the liner to permit the gravitational flow and run off of any fluids that might enter the pervious infiltration layer, a monitoring system, said system including means for providing for the gravitational flow and run off of any leachates and water in the liner or the first or second protective layers, a perimeter support wall means about the periphery of the second protective layer to hold in place the layers, liner, and hazardous waste and thereby restrain the horizontal slippage of the hazardous waste, a cap formed over the second protective layer to protect the hazardous waste from the surface environment, and a support base under the liner, layers, and perimeter support wall means and proximate to the surface of the ground, said support base including an impervious top surface above the ground, the support base providing a barrier between the ground and hazardous waste.

As embodied and broadly described herein, the process of the invention comprises a process for safely containing hazardous waste comprising the steps of forming a support base on or above the ground surface to provide an impervious barrier, forming on the support base an outer liner integrity detection system which includes means for providing for the gravitational flow and run off of leachates and water, forming an outer pervious protective layer over the leachate collection system, placing a liner for the hazardous material on top of the protective barrier, the liner being impervious to water and leachates that the hazardous waste might produce, forming a inner protective layer about the inner periphery of the liner, placing the solidified hazardous waste within the liner and against the inner protective layer, sealing the liner about the hazardous waste to encapsulate the hazardous waste, forming about the outer periphery of the liner a pervious infiltration layer to permit the gravitational flow and run off of any water or fluids that might enter the pervious infiltration layer, forming about the perimeter of the pervious infiltration layer a perimeter support wall to securely hold the hazardous wastes, layers and liners in place and thereby restrain the horizontal slippage of the Hazardous waste, and forming a cap over the infiltration layer and hazardous waste to protect the hazardous waste from the surface environment.

In the preferred embodiment of the invention the hazardous waste is formed into a dry, solidified and load-bearing state. Usually, any free standing water is first removed from the hazardous waste, and the waste is then mixed with a fixing material to form a solidified waste. It is further preferred that the structure of the above ground vault includes a monitoring system for collecting and measuring runoff water, as well as any leachates. With the monitoring system, a rain balance can be prepared to determine whether surface water might be leaking into the vault. The preferred monitoring system has separate monitoring levels to allow the detection of leaks before any of the surrounding environment is contaminated. In addition, the preferred monitoring system includes means for determining the approximate location of any leaks of water or leachate in the structure.

It is understood that both the foregoing general description and the following detailed description are exemplary and explanatory only and are not restrictive of the invention, as claimed.

The accompanying drawings, which are incorporated in and constitute a part of this specification, illustrate the invention and a preferred embodiment of the invention and, together with the description, serve to explain the principles of the invention.

DETAILED DESCRIPTION OF THE PREFERRED EMBODIMENT

Reference will now be made in detail to the invention and the present preferred embodiments of the invention, examples of which are illustrated in the accompanying drawings.

The invention is directed toward a process and structure for disposing of or storing hazardous waste and isolating that waste from the surrounding environment. The above ground structure or vault of the present invention is shown in representative form in FIG. 1, and the structure is designated generally by the numeral 12. The vault 12 is designed to contain hazardous waste material 14. As will be explained in more detail below, in the preferred embodiment the waste material 14 is processed into a dry, solidified, stable, and load-bearing state before it is placed in the vault 12.

Figure 1:
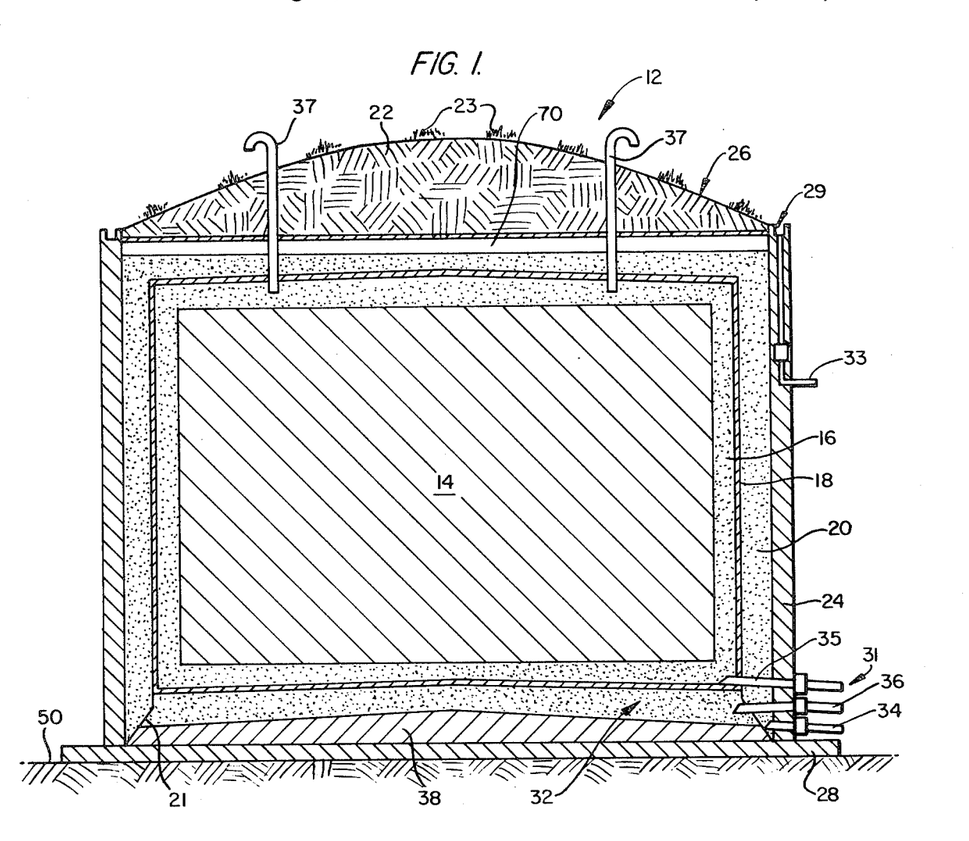
FIG. 1 is a cross sectional view of a representative embodiment the present invention which shows the basic components of the invention.

As shown in FIG. 1, the hazardous waste material 14 is immediately surrounded by an inner protective layer 16 which spaces the hazardous waste from a liner 18. In the preferred embodiment, liner 18 forms a barrier to both water and any leachate that the hazardous waste might produce. To the extent possible, that barrier is designed to be impermeable to both water and potential leachates. An outer protective layer 20 surrounds the liner 18 and serves as a protection barrier, as well as an infiltration layer. Layer 20 is pervious and the top and sides of the liner are designed to permit the gravitational flow and run off of water and other fluids that might enter that layer. The solidified waste material 14, protective layers 16 and 20, and liner 18 are enclosed and held in place by one or more perimeter support walls 24. As further shown in FIG. 1, the structure also includes a protective cap 26 at the top of the structure, and a support base 28 at the bottom. The cap 26 protects the hazardous waste from the surface environment, and the support base 28 forms an impervious barrier between the hazardous waste and the ground water.

The invention includes means for collecting, measuring and removing any water, leachate or other fluids that enter or exit from the vault 12. Preferably, the structure includes a runoff water detection system 29, a cap integrity detection system 30, an inner liner integrity detection system 31 and an outer liner integrity detection system 32. The runoff water detection system 29 can collect and measure all of the water which falls on the vault and ultimately runs off the cap. The cap integrity detection system 31 collects and measures any surface water which might leak through the cap and seep through the infiltration layer 20. The inner liner integrity detection system 31 collects and measures any leachate that might seep to the bottom of the liner 18. The outer liner integrity detection system 32 is formed under the outer protection layer 20 to collect and measure any leachate that might flow through the bottom of liner 18.

As will be explained in more detail below, each of the above detection systems operate on gravitational flow principles. For example, as shown in FIG. 1, the outer liner integrity detection system 32 is placed on an impervious, inclined platform 38 formed over the base 28. The inclined platform 38 provides a raised, inclined support for the outer liner integrity detection system 36. Preferably, the inclined platform 38 and the base 28 are formed of strong but resilient materials which are resistant to earthquakes and lesser seismic tremors and which will accept minor subsidence of the surrounding earth.

As shown in FIG. 1, the base support 28 is formed above the top ground layer 50 and therefore above the water table and the liquid flow of ground water. As will become more apparent from the discussion below, the structure of the present invention isolates the waste from both surface and ground water. Placing the hazardous waste and all encapsulating material above the ground on the impervious base 28 markedly minimizes the risks that contaminant can leach to the ground water. The above ground system also makes it easier to discover any leakage in the vault and take corrective action, if leakages occur. The above ground cell is designed to isolate the hazardous waste from the surrounding environment for indefinite periods.

The structure of the present invention is designed to dispose of and isolate a wide variety of hazardous waste. Classes of waste that can be safely held by the vault are identified in a later section of this application. Generally, hazardous wastes have a very low load-bearing capacity and exhibit a high incidence of slippage, when in their original form. Often these hazardous wastes include a high concentration of water. If these wastes are mixed with earth, the resultant mixture generally continues to exhibit non-loading-bearing characteristics. Therefore, if a load-bearing structure is desired, the waste must be treated.

Figure 2:
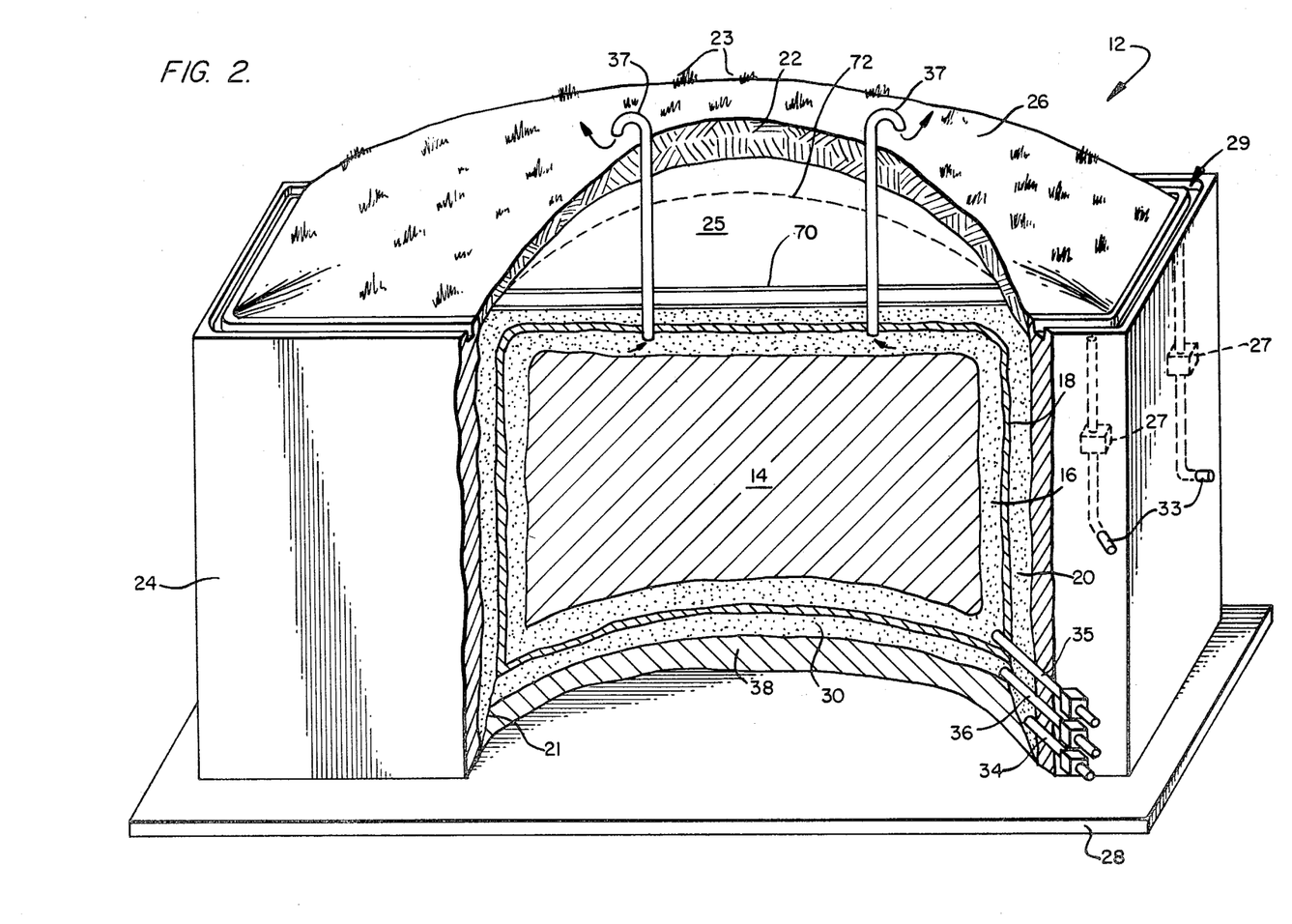
FIG. 2 is a partial cross-sectional of an above ground vault for hazardous waste made according to the invention.

A partial perspective view illustrating an embodiment of the structure of the present invention is shown generally in FIG. 2, where like numbers are used to refer to the elements previously discussed with reference to FIG. 1. As shown in FIG. 2, the structure or vault 12 is above ground and is covered by a cap 26 which can include vegetation. The cap 26 is designed to promote water run off, and preferably top soil 22 and vegetation 23 are placed on the cap 26 to add to the durability of the vault and to minimize the potential for erosion. The structure 12 includes a plurality of pipes 33, 34, 35 and 36 which are part of the runoff water detection system 29, cap integrity detection system 30, inner liner integrity detection system 31, and outer liner integrity detection system 32, respectively. The structure also includes vent pipes 37 which allow gas to vent off from the hazardous waste.

In addition to the elements previously described, the preferred embodiment in FIG. 2 includes an optional load-bearing structure 70 to provide increased strength in the cap and to further protect the hazardous waste from the exterior environment. The structure may additionally include an animal barrier 72 to prevent any burrowing animals from burrowing to or through the liner 18. Barrier 72 could be a wire mesh or a similar barrier which an animal could not penetrate. As an alternative, the cap or other areas surrounding the hazardous waste 14 and its liner 18 could be laced with a rodenticide.

As shown in FIG. 2, the cap 26, the top surface of the liner 18, the surface of the inner liner integrity detection system 31, the outer liner integrity detection system 32 and the platform 38 are all inclined to promote the rapid run off of any water, fluids or leachates. While the inclination could be in a single direction or in multiple directions, in the preferred embodiment the respective surfaces all incline from their centers outwardly and downwardly. The structure includes water run off-pipes 33 as part of the runoff water detection system 29 and pipes 34 as part of the cap integrity detection system 30. In addition, the structure includes leachate run off pipes 34 and 36 which form part of the inner liner integrity detection system 31 and outer liner integrity detection system 32, respectively. Preferably a plurality of these pipes are uniformly spaced about the periphery of the vault, and a fluid flow meter 27 can be integrated in the piping to measure fluid flow through each pipe. Any fluid flow through these pipes can be collected so that the fluid can be measured and analyzed.

The design and purpose of the structural elements of the invention and the materials from which those elements can be made will now be discussed in further detail.

The present invention can dispose of or store hazardous waste in a viscous liquid, sludge or solid form. In the preferred embodiment, however, the waste is solidified. Depending upon the form of the hazardous waste and material comprising that waste, different methods are available for solidifying the waste. Generally, the waste is solidified by de-watering the waste and then mixing the de-watered waste with a fixing agent. If a hazardous waste is high in water content, standing water is first pumped away from the waste. The present preferred method of solidification is then to mix the hazardous waste with a fixing agent such as cement flue dust. Cement flue dust has a high surface area and therefore will adsorb water and dehydrate the waste. Flue dust will solidify the waste, increase the PH of the waste mixture, convert metals in the waste to insoluble hydroxides, carbonate, and similar compounds and physically adsorb non-volatile organics. Further, over a period of several hours, the mixture of hazardous waste and cement flue dust will cure into a hydraulic cement-like substance. Thus, the flue dust acts as a pozzolanic material. The resultant hardening occurs because cement flue dust contains appreciable quantities of anhydrous calcium and metal silicates which dehydrate with water in the hazardous waste to form a stable crystalline material. Once hardened, the hazardous waste will not redisperse, even when exposed to water.

Under certain circumstances it is desirable to add certain materials to flue dust before mixing the flue dust or other fixing agent with the waste. Some inorganic adsorbents have a large surface area and when in contact with the waste will adsorb significant quantities of water and oil. Such adsorbents lessen the fluidity of the waste and permit the use of lesser quantities of flue dust, often with improved results. Certain organic adsorbents will draw the oil in the hazardous waste out from the water, while not reacting with the water. The flue dust then can react primarily with the water and other materials in the waste, often providing an improved solidified waste. By means of example only, calcined rice hulls, activated carbon, and/or granulated calcined oil shale could be added to flue dust to be mixed with inorganic wastes, and activated carbon and/or LOCK SORB could be added with flue dust to be mixed with organic wastes. The amount of adsorbents that should be added to flue dust would depend upon the waste involved and the result desired. Generally, these materials could be added to flue dust in amounts equal to 5–20% of the combined weight of the absorbent material and flue dust.

For particular hazardous wastes or applications, other types of solidification agents may be used. For instance, coal-fired boiler fly ash can serve as a fixing agent and has similar properties to those of cement flue dust. The properties of fly ash vary from coal to coal, however, and therefore the fixing quantities of fly ash are not always uniform. Chemical solidification agents such as CHEMFIX and STABLEX may be used to solidify the mass of some hazardous wastes. Chemical solidification agents are primarily used for inorganic materials such as metal oxides and salts.

Regardless of the method of fixation, the resultant solidified waste must be bonded together so that it will resist returning to a fluid state. A sufficient amount of fixing material, such as flue dust, must be added to the material so that it is dry, solidified, and has load-bearing characteristics similar to earth. Generally, the waste, when solidified, will have a bulk density of approximately 1,800 to 2,400 pounds per cubic yard. The exact weight will of course depend upon the particular density of the hazardous waste. Nevertheless, because the solidified waste of most materials will fall within the above range, the design of the vault and the required thicknesses and strength of the various layers which form the invention can be standardized to some degree.

When placed in the structure, any solidified waste should be compacted to achieve a 95% Proctor or similar soil load-bearing standard. For certain applications it may be preferable to form the hazardous waste in lifts or layers. For other applications, it might be preferable to have several separate compartments with the vault to hold and separate waste which are or might become coreactive. Once placed within the above ground vault, the waste itself becomes a major supporting structural component of the vault.

The solidified hazardous waste material is surrounded by protective layer 16. Layer 16 provides a buffering layer between the waste and the liner 18 to prevent reactivity between the waste and liner. It also provides an anti-shock cushion, as well as a separate layer which can serve as a construction support mechanism. The layer 16 is pervious and preferably is inclined so that is will act as part of an inner liner integrity detection system 31. Any leachate in the waste or liner will ultimately flow to the outer periphery of the layer 16 where it can be collected and measured by one or more pipes 35. Each junction between the pipes 35 and the liner 18 must be carefully sealed to prevent leakage.

By means of example only, the layer 16 can be made of sand, sand solidified with fly ash, constructive fabric materials, and inorganic sorbents such as OIL-DRI and SORB-ALL. The layer can be formed from one material or a combination of several materials, and, if desired, the layer can include perforated run-off pipes to collect and drain any fluids. The layer 16 is positioned about the waste by pouring as the lifts of waste are constructed. Generally, the layer 16 should be thick enough to safely separate the liner from the waste and cushion the waste from shocks during construction. The layer 16 also should be sufficiently pervious to permit the free flow of any leachate in the liner. To some degree, the desired thickness will depend upon the weight of the waste and the load-bearing characteristics of the material forming the layer. Typically, the layer would have a thickness in the range of 6 to 18 inches.

The relatively impermeable liner 18 is designed to isolate the waste from water and to prevent the flow of leachates to or from the wastes. The liner 18 must be made from material that is resistant to any leachate that might be generated. Generally, clays, asphalts and synthetic sheets are the major types of materials that might be appropriate liners for specific hazardous waste and their respective leachates. Since the liner 18 is expected to function for decades, it must be protected from weathering processes, sharp objects, and biological activities that could penetrate it.

The particular liner used would depend upon the waste and the potential leachates. A solvent cut of high molecular weight asphalt sprayed upon unwoven fabric mat might serve as a good liner for some waste. The present preferred liners can be made from polyvinylchloride (PVC), low density polyethylene (LDPE), medium density polyethylene (MDPE), ethylene propylene dimer (EPDM), butyl rubber, and chloro-sulfonated polyethylene, such as HYPALON. If desired or necessary for a particular application, the liner can be reinforced. For example, the liner could be laminated to a fabric backing. Generally, plastic liner films should be at least 0.006 inches thick and preferably would be in the range of 0.006 through 0.1875 inches thick. The liner should be flexible and have the ability to withstand a significant range of climatic conditions.

The liner 18 is spaced from the outer liner integrity detection system 32 by a protective layer 20. Layer 20 performs many of the same functions as does layer 16, and can be made from the materials previously listed for layer 16. If sand is used for either layer 16 or 20, the sand should be angular, graded sand having particles which do not have sharp edges. The layer 20 provides as a collection pathway to the detection system 32 and will filter out leachate solids to prevent clogging of the outer liner integrity detection system 32. The layer 20 should cushion the liner 18 from any rocks or pointed articles included as part of detection system 32 and should permit water or leachate to flow freely. In the preferred embodiment, the layer, to provide the desired protection, cushioning, and filtration effect, has a thickness in the range of 6 to 8 inches. For most vaults, the layers 16 and 20 will be made from the same materials in order to save on material costs.

The side and top portions of layer 20 provide an infiltration channel for the run off of any water which might happen to leak through cap 26. Layer 20 also provides a channel for any leachate that might leak through the top or sides of liner 18. As shown in FIG. 2, the top and side portions of layer 20 are separated from the bottom portion of layer 20 by a barrier 21 which is impervious to water and potential leachates. The top and side portions of the layer 20 and the barrier 21 constitute part of the cap integrity detection system 30 and therefore must be constructed to remain stable as water flows through them and as temperatures change. These portions of layer 20 can be made of a wide variety of porous materials. If necessary, the integrity detection system 30 can include piping and even water monitors in the interior of the system which would indicate when and generally where any leakage in the cap occurs. Such monitors would enable the repair of the cap before any water leaks through the liner to the hazardous material. As should be apparent, leakage of water to the solidified waste is the main source of contaminated leachate.

The outer liner integrity detection system 32 should provide a layer which will quickly remove leachate from the vault for many years and preferably never allow the leachate to accumulate. The system 32 may consist of perforated piping embedded in porous media such as gravel or sand. The grain size of the porous medium or media, the pipe placement, the pipe cross-sectional shape, and the size, shape, pattern and screening of the system may vary, depending upon the type of waste, the environmental conditions and the size of the vault. The pipes in the system should be designed so that they are amenable to a periodic cleanout operation. For example, the design should permit snakes or similar mechanical devices to be inserted in the pipes or should allow for the application of a flushing operation. Preferably, the leachate collection layer will be designed to function by gravity alone. If desirable, however, pumping could be added as an ancillary method of leachate removal.

Figure 3:
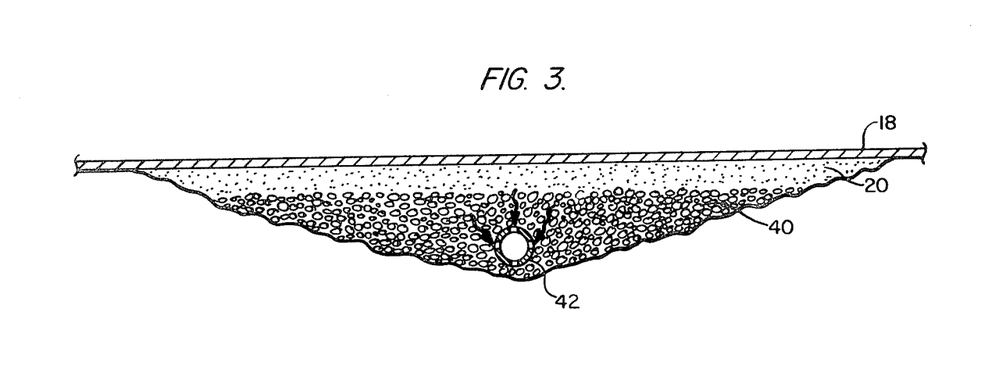
FIG. 3 is an incomplete side cross-sectional view showing a cross-section of the outer liner integrity detection system of the invention.
Figure 4:
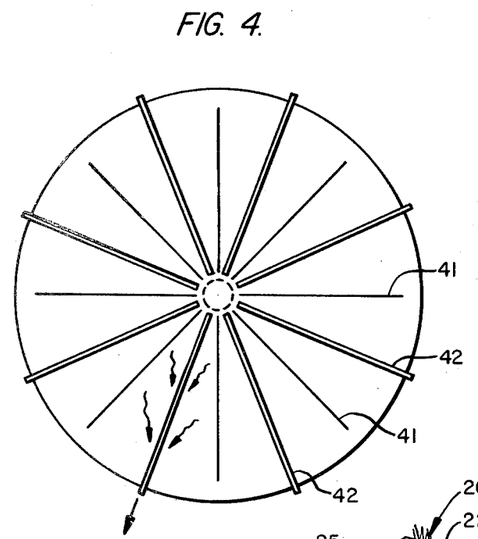
FIG. 4 is a top plan view of a preferred embodiment of the outer liner integrity detection system of the invention.
Figure 5:
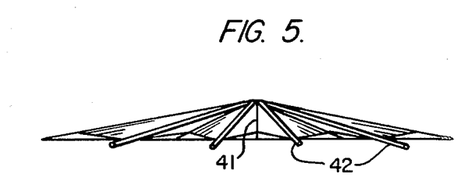
FIG. 5 is a side view of the preferred embodiment of the outer liner integrity detection system shown in FIG. 4.

As an example illustrating aspects of the detection systems, the preferred embodiment of the outer liner integrity detection system 32 is shown in FIGS. 3, 4 and 5. The leachate system as shown includes graded gravel 40, separators 41, and perforated collection pipes 42. The gravel 40 should be sufficiently large to provide large pore spaces throughout the system. The perforated collection pipes 42 should be resistant to the potential leachates and should be sufficiently large to allow rapid runoff. The system and piping are inclined to promote gravity flow, and the angle of inclination could be in the range of 1 to 5 degrees, depending upon the size and shape of the vault.

As can be seen in FIGS. 4 and 5, in the preferred embodiment of the invention, the system 32 includes a plurality of radially extending pipes 42 and a plurality of separators 41. The separators 41 are impervious to water and potential leachates and divide the system 32 into a number of separate segments. One or more pipes are placed in each separate segment of the system, and in the preferred embodiment each pipe connects with an individual exit pipe 36 so that any leachate flowing through the pipe can be collected and measured. Thus, to the extent that any leachate is collected at any pipe, the system will indicate the general section where leakage from the waste material is occurring. This would enable one to determine where a rupture occurs and then limit any remedial action to the area of concern.

Although not shown, it is contemplated that each of detection systems, 29, 30, 31, and 32 can be designed similar to system 32. For example, separators similar to separator 41 could be included in the top and side portions of layer 20, in the bottom portion of layer 16, and in the cap 26. If desired, collection pipes could also be added to those systems. A plurality of exit pipes 34 and 35 could be spaced about the periphery of the vault. The resulting systems would allow one to detect and locate any leak or ruptures in the system.

The inclined platform 38 serves as an impervious inclined base for the outer liner integrity detecting system 32 and as an impervious inclined bottom of the infiltration layer 20. The platform 38 provides a head pressure for any fluid in either of these detection systems and serves as an additional safety barrier between the waste or any leachate and the base. The platform preferably is made from clay or asphalt, both of which are impermeable and have excellent healing characteristics. The platform 38 preferably would have a minimum thickness in the range of 1-3 feet.

The support base 28 of the vault should be impervious to water and any potential leachates and should provide a strong and solid base for the vault. The base should preferably be made to support at least 1,845 pounds per square foot. Preferably, the base would be a road base construction with an impervious top layer of clay or asphalt. Depending upon the size of the vault, the base might be made from several layers of a typical road base construction, including graded bases, gravel layers, reinforcement bars, road fabric, and so forth. The base could be made with standard road construction machines and materials.

Solidified waste bearing material will exhibit good vertical load-bearing characteristics when properly confined. However, it is believed that solidified waste does not have strong horizontal stability and strength. Therefore, the structure of the valut must include perimeter support walls 24 to stop any slippage of the material in a horizontal direction. These structural walls can be made from a wide variety of materials such as precast concrete slabs (reinforced or stressed), cinderblocks, poured concrete, logs, telephone poles, pilings, metal sheets, or even thick clay. To increase the strength of the walls, buttresses, cables, reinforcement bars, and dead man reinforcements might be added. The perimeter wall may have to withstand lateral pressures of from 200 to 1,000 pounds per square foot. The actual value would depend upon the geometry of the structure and the structural cohesiveness of the waste.

The cap layer 26 will be exposed to the greatest temperature extremes as well as erosion action of sunlight, rain fall, overland water flow, wind and freeze/thaw action. The cap must protect the inner layers from erosive action and yet remain stable itself. To the extent possible, the cap should be designed to be completely impermeable. The main component of the cap 26 can be made from a layer 25 of compacted clays, sprayed urethane foam, asphalt or a reinforced concrete slab. Generally, the cap 26 would have a thickness within the range of 6 inches to 3 feet. Sprayed urethane foam would require ground cover and a positive attachment. Liners similar to liner 18 could be included at the bottom surface of the cap.

As shown in FIG. 2 the vault includes a runoff water detection system 29. Any precipitation falling on the vault should run off the inclined cap 26 to the gutter 43 formed about the perimeter of the vault. The system 29 includes a plurality of gravity fed drainage pipes 33 spaced about the periphery of the vault. Each pipe 33 can include a flow meter 27, such as a vane-type meter, which in turn can be connected to a recording device. The system, therefore, should collect and measure all the precipitation which falls on the vault.

If the top of the vault is to serve as a park or grassy area, top soil 22 and ground cover 23 should be added to layer 25 of the cap. The top soil and cover combine to serve as a excellent water runoff system and stabilize the exterior of the vault. If the top of the vault is to be used as a support for a parking lot, tank farm, or similar structure, a additional support structure 70 may be formed under the base, if needed. The load bearing capacity of a vault, without additional support structure, would be approximately 2,800 pounds per square foot when the vault contains load-bearing, solidified waste. The cap can be surfaced with a number of exterior construction surfaces, as desired.

Additional fabric can be used to strengthen the vault. Such fiber typically would be a synthetic fabric, such as construction fabrics for road based construction. Such materials are readily available and can also be supplied as a filter or drainage fabric. Fabrics could be used to add an additional impervious barrier between the cap and the liner or could be used to distribute point loading or cancel stresses.

The hazardous waste material will be significantly insulated from exterior temperatures. However, even assuming that the material is subject to differences in temperature between 120° and −20° Fahrenheit, the thermal expansion and contraction of the waste would not present a significant problem. Solidified hazardous waste in most circumstances would have a coefficient of thermal expansion of approximately $2.5 \times 10^{-6}$ in./in./°F. For hazardous waste having a length of 930 feet, the largest potential expansion over the range of 120° Fahrenheit to −20° Fahrenheit would be $3\frac{1}{2}$ inches. This small degree of expansion should not present significant problems and the effects of the expansion could be further minimized by including expansion joints between vertical and/or horizontal layers of waste. The expansion joints could be formed of sand and similar materials.

Figure 6:
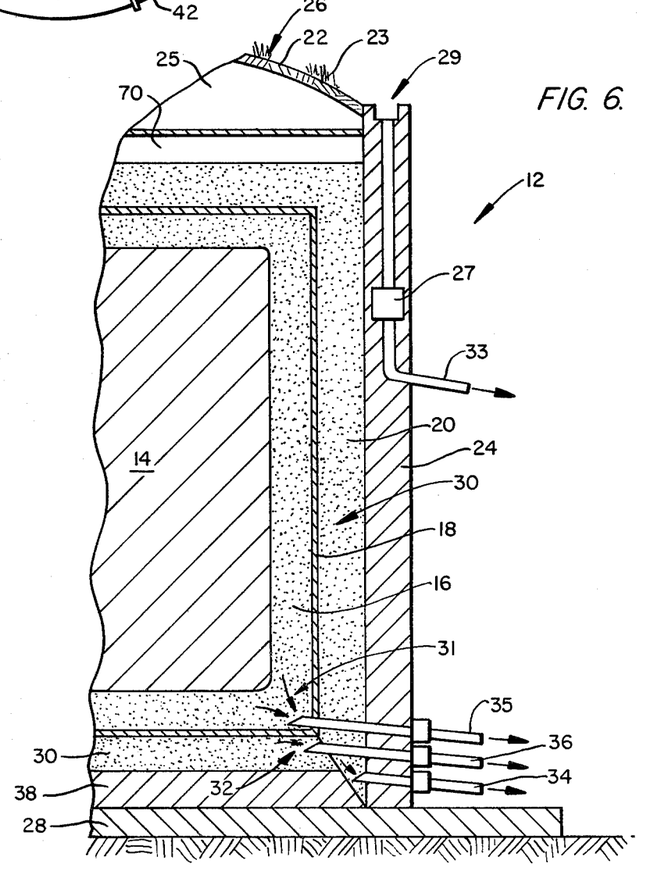
FIG. 6 is a side cross-sectional view showing portions of the water and leachate monitoring system of the preferred embodiment of the invention.

The vault provides a multi-step monitoring system which previously has not been possible with below ground containments. As previously discussed, the system includes four separate detection systems steps which will detect fluid leakage before any contamination of the ground or ground water occurs. Referring now to FIG. 6, the monitoring system will be briefly explained.

The first line of safeguard monitoring is provided by runoff water detection system 29. Under normal operating conditions, all of the precipitation which falls upon vault 12, except that which evaporates, will be collected and measured by system 29. By periodically checking the amount of water collected and measured by system 29 and comparing that amount with actual precipitation, a water balance can be computed. If the water collected balances with the precipitation, the clay cap 26 is properly protecting the waste from surface water. If the balance is not correct, then there may be a rupture in the cap. By analyzing the measured water runoff, the approximate area of a rupture in the clay cap can be determined. This data can be combined with data collected by the cap integrity detection system, as will be discussed below.

The second monitor, the cap integrity detection system 30 will collect and measure water and/or leachate only if surface water leaks through the cap 26 (or in flood situations the perimeter walls 24). Thus, if system 29 shows a water imbalance and water is collected at certain outlet pipes 34 of system 30, it is possible to at least roughly locate where the cap 24 is ruptured by reviewing the data collected by systems 29 and 30. Both systems, alone, will indicate the general area of the cap rupture and in combination should allow a good approximation of the location of a leak. If the fluid collected in cap integrity detection system 30 is not contaminated by waste, then the only rupture would be in the cap, and not the liner. If contaminated leachate is collected, then the system 30 would indicate that the top or side of the liner was ruptured. Again, the approximate location of the rupture could be determined through an engineering analysis of the data collected by system 30.

The third monitor, the inner-liner integrity detection liner 31, will collect and measure leachate at outlet pipes 35 only if the liner ruptures at some location above layer 16. The system will quickly remove any leachate collected in the liner and also will provide information concerning the location of rupture and the size of the rupture.

Finally, the fourth monitor, the outer-liner integrity detection liner 32, will collect and measure leachate at outlet pipes 36 only if the bottom of liner 18 ruptures. The system again provides for the rapid runoff of any leachate. Any leachate collected is still far removed from the ground and ground water, and the system provides information concerning the location of any ruptures and the degree of contamination.

Through the use of all four detection systems, one can carefully monitor the vault and prevent contamination of the ground and ground water. The system gives an early warning of any problem and allows minor problems to be completely remedied with minimum costs and without any contamination. For example, with the system any ruptures in the cap can be sensed, located, and corrected before any water even reaches the waste itself. To the extent that a line does rupture, the extent of leachate generation can be closely monitored and corrective steps can be taken long before any leachate reaches the ground.

The above ground vault can be used to dispose of a wide variety of wastes, including the following types: (A) Petroleum Heavy Oils and Tars (e.g., API separator sludges, petroleum still bottoms, oil reclaiming sludges); (B) Aromatic Heavy Oils and Tars (e.g., creosote sludges and tars, scrubber sludges from coke ovens, resorcinol refining sludges, aromatic hydrocarbon still bottoms); (C) Petrochemical Heavy Oils and Tars (e.g., polymer manufacturing tars and sludges, solvent recovery still bottoms, chemical production still bottoms, isocyanate production tars); (D) Halogenated Organic Sludges and Tars (e.g., PCB containing sludges, vinyl chloride manufacturing bottoms, dioxin containing sludges, chlorinated solvent manufacturing bottoms); (E) Pesticide/Herbicide Sludges (e.g., arsenic chemicals manufacture, halogenated pesticide manufacture, phosphorous based pesticide manufacture, pesticide/herbicide repackaging); (F) Organic/Inorganic Sludges (e.g., paint sludges, railcar cleanout sludge, dewatering sludges, headed petroleum tank bottoms); (G) Inorganic Sludges (e.g., metal finishing and plating wastes, wastewater treatment sludges, chrome sludges from polymer manufacture, waste sludges from metals smelting); and (H) Contaminated Soils (e.g., massive chemical spills, heavy metals contaminated soils, organic contaminated soils).

For the above types of waste, the following tables show the preferred methods of solidiferation and perferred materials from which the vault can be made:

| CHOICE OF LINEAR MATERIAL | | | | | | | | |
|---|---|---|---|---|---|---|---|---|
| | Waste Characterization | | | | | | | |
| Linear Type | A | B | C | D | E | F | G | H[1] |
| Plasticized PVC Film (PVC) | P | P | P | P | G | P | VG | F-VG |
| Low Density Polyethylene Film | P | P | P | P | G | P | G | F-VG |
| Med. Density Polyethylene Sheet | VG | F-G | F-G | F | VG | G | VG | VG |
| Ethylene Propylene Dimer (EPDM) | P | P | P | P | G | P | VG | F-VG |
| Butyl Rubber Sheet | P | P | P | P | G | P | VG | F-VG |
| HYPALON Sheet | G | F-G | F-G | P | VG | G | VG | VG |
| Hi MLD. Asphalt Coating | F-G | F | F | F | G | F | VG | G-VG |
| Clay 10.7 cm/sec | G | F-P | F-P | P | G | F | G | VG |

E - Excellent
VG - Very Good
G - Good
F - Fair
P - Poor
[1]Dependent on concentration any type of dirt contamination.

The above rating on the choice of liners is made upon a review of the various overall properties of the materials and a comparison of those properties with the desire that the line 18 be resistant to solvation, plasticization, stress cracking, and chemical attack.

| CHOICE OF SOLIDIFICATION METHOD | | | | | | | | |
|---|---|---|---|---|---|---|---|---|
| Solidification Method | Waste Characterization | | | | | | | |
| | A | B | C | D | E | F | G | H[3] |
| Cement Kiln Five Dust (CKD) | G | G | G | G | G-E | G | E | E |
| Coal Fired Boiler Fly Ash (F/A) | G | G | G | G | G-E | G | E | E |
| [1]Inorganic Absorbent | V-G | V-G | V-G | V-G | G-E | V-G | E | E |
| [2]Organic Absorbent | V-G | V-G | G | G | G-E | V-G | — | — |
| CHEMFIX | P | P | P | P | G | P-F | E | E |
| STABLEX | P | P | P | P | G | P-F | E | E |

[1]As mixed with CKD or FA.
[2]As mixed with CKD of FA.
[3]May not be necessary to use solidification.
E.
VG.
G.
F.
P.

| CHOICE OF PIPING | | | | | | | | |
|---|---|---|---|---|---|---|---|---|
| | Waste Characterization | | | | | | | |
| Leachate Piping | A | B | C | D | E | F | G | H[1] |
| Rigid PVC | F-G | P-F | F | P | G | F | E | G-E |
| Polypropylene | G | F | G | F | G | G | E | E |
| ABS | P | P | P | P | F | P | E | P-E |

[1]Dependent on concentration and type of dirt contamination. Other components of leachate system are resistant also components of buffer and infiltration layers are resistant.

As is apparent from the above discussion, the invention can safely contain a wide variety of hazardous wastes and can be made in a wide variety of shapes and sizes. The height of the cell will depend upon the amount of hazardous waste to be contained and the asthetic effect desired. Normally the height of solidified waste could be between 5 feet and 20 feet.

The present invention offers many advantages over conventional remedial action such as slurry-wall containment and off-site disposal. The vaults can be built either at private on-site locations or at larger publically available sites. With on-site vaults, a generator will not have to pay to transport the wastes, and the public will not be subjected to the hazard that contamination will occur during the transportation step. The waste in the vault is solidified and encapsulated above ground, away from the ground water. The prevention and collection of waste leachate are simplified greatly over the landfill method. Significantly, there is less risk of contaminating ground water because the entire system is above ground, with a larger buffer zone between the waste and the ground and ground water. Access for maintenance is easier, and the top, walls and all fluids in the system can be visually inspected. Any leachate can be detected prior to ground water contamination. Additionally, the leachate collection systems need not be dependent upon pumps but instead can rely upon gravitational flow. Further, the risk of ground water contaminaion in the event of geological action such as fault slippage, slumping, or any other massive earth movement is reduced.

When the above ground encapsulation method is used, the site can be cleaned up and made available for other uses. In contrast, when a company uses ground water containment barriers and similar remedial actions, the site must remain useless for other purposes.

With vegetation and landscaping techniques, above ground encapsulation can enhance the asthetics of an area and serve as bird sanctuaries, parking lots, or any thing within the creative capabilities of designers and planners. Above ground encapsulation is safe, simple and an economic remedial method that can be used at on-site locations and abandoned waste sites.

Other embodiments of the invention will be apparent to those skilled in the art from consideration of the specification and practice of the invention disclosed herein. It is intended that the specification and examples be considered as exemplary and explanatory only, with a true scope and spirit of the invention being indicated by the following claims:

What is claimed:

1. A hazardous waste system for safely containing hazardous waste substances comprising:
   a first protective layer for surrounding the hazardous waste;
   a liner around the protective layer, said liner being relatively impervious to water and to leachates that the hazardous waste might produce;
   a pervious second protective layer around said liner, the top and side portions of said second protective layer providing a pervious infiltration layer around the sides and top of the liner to permit the gravitational flow and run off of any fluids that might enter the pervious infiltration layer;
   a perimeter support wall means about the periphery of the second protective layer to hold in place the layers, liner, and hazardous waste and thereby minimize any horizontal slippage of the hazardous waste;
   a cap over the second protective layer to protect the hazardous waste from the surface environment; and
   a monitoring system means for providing for the gravitational flow and run off of any water and leachates on the cap, in the liner, or in the first or second protective layers;
   a support base under the liner, layers, and perimeter support wall means and proximate to the surface of the ground, said support base including an impervious top surface above the ground and providing a barrier between the ground and hazardous waste.

2. The hazardous waste system of claim 1 wherein said monitoring system includes means for collecting and measuring of any water and leachates that flow over the cap, or through the liner or the first or second protective layers.

3. The hazardous waste system of claim 1 wherein said monitoring system includes means for detecting ruptures in the cap or the liner.

4. The hazardous waste system of claim 3 wherein said monitoring system includes means for determining the approximate location of any detected ruptures in the cap or the liner.

5. The hazardous waste system of claim 4 wherein said monitoring system includes a plurality of radially extending pipes.

6. The hazardous waste system of claim 4 wherein said monitoring system includes a plurality of radially extending separators.

7. The hazardous waste system of claim 4 wherein said monitoring system includes a plurality of radially extending separators and a plurality of radially extending pipes, said pipes being positioned betweed adjacent separators and said pipes and separators having a common center.

8. The hazardous waste system of claim 1 wherein said monitoring system includes an outer liner integrity detection system below said second protective layer for collecting and measuring any leachates that flow through the portion of the second protective layer which is below said liner.

9. The hazardous waste system of claim 1 wherein said monitoring system includes a runoff water detection system for collecting and measuring precipitation that falls on and runs off the cap.

10. The hazardous waste system of claim 9 wherein said monitoring system includes a cap integrity detection system for collecting and measuring any fluids that flow through the infiltration layer.

11. The hazardous waste system of claim 9 wherein at least the upper surface of said cap is impervious to water.

12. The hazardous waste system of claim 10 wherein said monitoring system includes an inner liner integrity detection system for collecting and measuring any leachate that flows to the bottom of the liner.

13. The hazardous waste system of claim 12 wherein the said runoff water detection system, said cap integrity detection system, said inner liner integrity detection system, and said outer liner integrity detection system each collect water or leachate through gravitational flow and runoff.

14. The hazardous waste system of claim 8 wherein said outer liner integrity detection system includes a plurality of radially extending drain pipes.

15. The hazardous waste system of claim 1 further comprising a load-bearing structure formed between said cap and said hazardous waste.

16. The hazardous waste system of claim 8 wherein said outer liner integrity detection system includes means for determining the approximate location of the initial source of any leachates collected.

17. The hazardous waste system of claim 8 wherein said outer liner integrity detection system includes a plurality of separators that divide the system into separate segments, a collection pipe in each segment, and outlet pipes connected to each collection pipe and protruding through said perimeter support wall.

18. The hazardous waste system of claim 1 further comprising an inclined platform formed on the support base.

19. The hazardous waste of claim 1 further comprising means for preventing animals from burrowing to or through said liner.

20. The hazardous waste system of claim 1 further comprising a vegetation barrier over said cap.

21. The hazardous waste system of claim 1 further comprising solidified, load-bearing hazardous waste within said first protective layer.

22. A hazardous waste system for safely containing hazardous waste substances comprising:
   solidified, load-bearing hazardous waste;
   a first pervious protective layer surrounding the solidified hazardous waste;
   a liner around the protective layer and the hazardous waste, said liner being impervious to water and to leachates that the hazardous waste might produce;
   an inner-liner integrity detection system at the bottom of said liner to collect and measure any leachate that seeps to the bottom of said liner;

a second pervious protective layer around said liner, the top and side portions of said second protective layer providing a pervious infiltration layer formed around the sides and top of the liner to permit the gravitational flow and run off of any fluids that might enter the pervious infiltration layer;

an outer liner integrity detection system under the second protective layer, said outer liner integrity detection system including means for providing for the gravitational flow and run off of leachates and means for the collecting and measuring leachates flowing through that system;

an inclined platform below the outer liner integrity system;

a perimeter support wall means about the periphery of the infiltration layer to hold in place the infiltration layers, liner and hazardous waste and thereby restrain the horizontal slippage of the hazardous waste;

a relatively impervious cap formed over the second protective layer to protect the hazardous waste from the surface environment;

a runoff water detection system for collecting and measuring precipitation that falls on and runs off the cap;

a cap integrity detection system for collecting and measuring any fluids that flow through the infiltration layer; and a support base under the hazardous waste, liner, protective layers, inclined platform and perimeter support wall means and proximate to the surface of the ground, said support base including an impervious top surface above the ground and providing a barrier between the ground and hazardous waste.

23. The hazardous waste system of claim 22 wherein each of said runoff water detection system, cap integrity detection system, inner liner integrity detection system, and outer liner integrity detection system includes a plurality of outlet pipes spaced about the perimeter of the system and protruding through the wall means to provide means for determining the approximate location of the initial source of any fluids collected and measured.

24. The hazardous waste system of claim 23 further comprising gas vent means for allowing any generated gases to vent off from said hazardous waste.

25. A process for safely containing hazardous waste comprising the steps of:

forming a support base on or above the ground surface to provide an impervious barrier;

forming on the support base a monitoring detection system which includes means for providing for the gravitational flow and run off of leachates and water;

forming an outer pervious protective layer over the leachate collection system;

placing a liner for the hazardous material on top of the protective barrier, said liner being impervious to water and leachates that the hazardous waste might produce;

forming a inner protective layer about the inner periphery of the liner;

placing the solidified hazardous waste within the liner and against the inner protective layer;

sealing the liner about the hazardous waste to encapsulate the hazardous waste;

forming about the outer periphery of the liner a pervious infiltration layer to permit the gravitational flow and run off of any water or fluids that might enter the pervious infiltration layer;

forming about the perimeter of the pervious infiltration layer a perimeter support wall to securely hold the hazardous wastes, layers and liners in place and thereby restrain the horizontal slippage of said hazardous waste; and forming a cap over the infiltration layer and hazardous waste to protect the hazardous waste from the surface environment.

26. The process of claim 25 further comprising the step of solidifying the hazardous waste by mixing the waste with a fixative.

* * * * *